United States Patent
Nahari et al.

(10) Patent No.: US 9,533,229 B2
(45) Date of Patent: Jan. 3, 2017

(54) CUSTOM REWARD FOR VIRAL HELP IN GAME

(75) Inventors: Edan Nahari, San Francisco, CA (US); Ian Guthridge, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 886 days.

(21) Appl. No.: 13/539,289

(22) Filed: Jun. 29, 2012

(65) Prior Publication Data

US 2014/0004955 A1    Jan. 2, 2014

(51) Int. Cl.
*A63F 13/00* (2014.01)
*A63F 13/85* (2014.01)
*A63F 13/35* (2014.01)

(52) U.S. Cl.
CPC .............. *A63F 13/85* (2014.09); *A63F 13/35* (2014.09); *A63F 2300/57* (2013.01)

(58) Field of Classification Search
CPC  A63F 13/795; A63F 13/798; A63F 2300/556; A63F 2300/5566; A63F 2300/558; A63F 2300/609
USPC ...................................................... 463/9, 42
See application file for complete search history.

(56) References Cited

U.S. PATENT DOCUMENTS

2006/0128471 A1* 6/2006 Willis et al. ................... 463/42
2007/0087797 A1* 4/2007 Van Luchene ................. 463/1
2008/0307320 A1* 12/2008 Payne ................... G06F 3/0481
                                                              715/751

* cited by examiner

*Primary Examiner* — James S McClellan
(74) *Attorney, Agent, or Firm* — Martine Penilla Group, LLP

(57) ABSTRACT

Methods, systems, and computer programs are presented for executing a game. One method includes an operation for detecting a petition for help from a first player to a second player to obtain a first game asset for the first player. The petition is sent to the second player notifying the second player that a game asset needed by the second player would be awarded to the second player for helping the first player. Further, the method includes operations for detecting that the second player has performed a game operation to help the first player based on the petition, and for determining a second game asset that the second player needs for making progress in the game in response to the game operation to help. After the determination, the second game asset is awarded to the second player.

20 Claims, 12 Drawing Sheets

Helping Hands

Team Viral

Custom Request

Custom Feed

Wish granted

CUSTOM REWARD FOR VIRAL HELP IN GAME

CROSS REFERENCE TO RELATED APPLICATIONS

This application is related to U.S. patent application Ser. No. 13/457,316, filed Apr. 26, 2012, and entitled "DYNAMIC QUESTS IN GAME", which is incorporated herein by reference.

BACKGROUND

1. Field of the Invention

The present embodiments relate to methods for executing games in a distributed environment, and more particularly, methods, systems, and computer programs for creating custom rewards in a game.

2. Description of the Related Art

Same games provide challenges to players, where the challenges entail the completion of one or more tasks. As the player completes each challenge, the player receives rewards and new challenges are provided to continue the game. In some games, players interact with other players to make progress. For example, if a player needs a widget, the player may ask another player for help to get the widget, what is sometimes referred to as a viral request. As a reward for being helpful, the helping player may also get a widget in return. However, the player that receives the help request may not need a widget, and the player is not motivated to provide help beyond the satisfaction of being a good friend, because the potential reward has no value in the game.

In order to provide incentives for players to complete viral requests for help, a system is desired that would provide incentives to motivate players to provide help to other players.

It is in this context that embodiments arise.

SUMMARY

Methods, devices, systems, and computer programs are presented for executing a game. It should be appreciated that the present embodiments can be implemented in numerous ways, such as a method, an apparatus, a system, a device, or a computer program on a computer readable medium. Several embodiments are described below.

In one embodiment, a method includes an operation for detecting a petition for help from a first player to a second player to obtain a first game asset for the first player. The petition is sent to the second player notifying the second player that a game asset needed by the second player would be awarded to the second player for helping the first player. Further, the method includes operations for detecting that the second player has performed a game operation to help the first player based on the petition, and for determining a second game asset that the second player needs for making progress in the game in response to the game operation to help. After the determination, the second game asset is awarded to the second player.

In another embodiment, a system for executing a game includes a processor, a game wish manager, and a game manager. The game manager is operable to detect a petition for help from a first player to a second player to obtain a first game asset for the first player, and to send the petition to the second player notifying the second player that a game asset needed by the second player would be awarded to the second player for helping the first player. Further, the game manager is operable to detect that the second player has performed a game operation to help the first player based on the petition. In addition, the game wish manager is operable to select a second game asset from a wish list associated with the second player, and to award the second game asset to the second player.

In yet another embodiment, a method includes operations for detecting a petition for help from a first player to a second player to obtain a first game asset for the first player, and for determining a second game asset that the second player needs for making progress in the game. The petition is sent to the second player notifying the second player that the second game asset would be awarded to the second player for helping the first player. After detecting that the second player has performed a game operation to help the first player based on the petition, the second game asset is awarded to the second player, where operations of the method are executed by a processor.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe a method and apparatus for executing a game and creating custom rewards in response to viral requests.

It will be apparent, that the present embodiments may be practiced without some or all of these specific details. In other instances, well known process operations have not been described in detail in order not to unnecessarily obscure the present embodiments.

Figure 1:
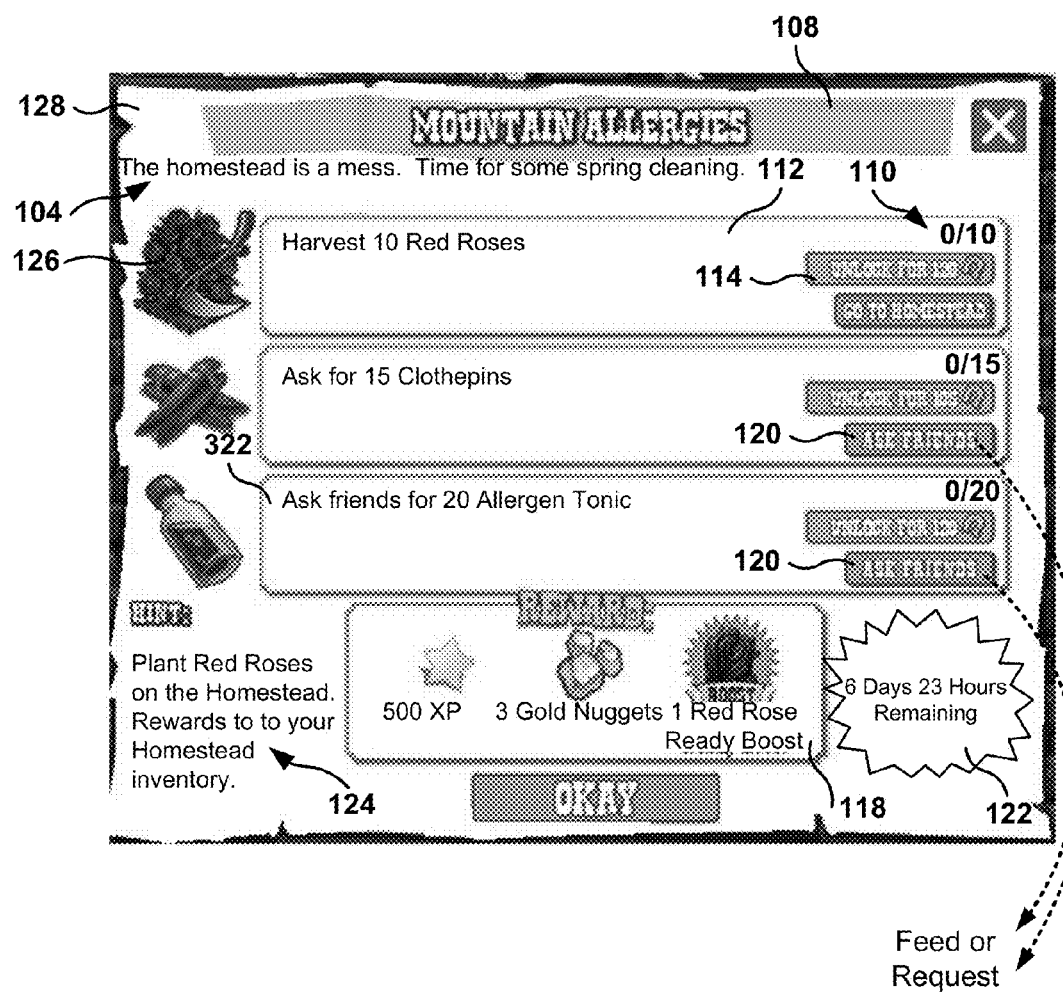
FIG. 1 illustrates a quest, according to one embodiment.

FIG. 1 illustrates a quest, according to one embodiment. Game challenges, sometimes referred to as quests, are typically created by development engineers that manually draft tens or hundreds, or maybe even thousands of different challenges for the players. But other quests may be computer generated. Quests that are created manually are referred to herein as crafted quests, or manual quests, which are different from dynamic quests, which are those quests generated by a processor executing a computer program that generates the logic and features of the quests. In other words, a dynamic quest is a computer-generated quest. FIG. 1 illustrates a quest 128, which includes title 108 (e.g., "Mountain Allergies!"), fiction 104, one or more tasks 112, one or more rewards 118, hint 124, and timer 122 indicating how much time is left for finishing the quest. It is noted that the embodiment illustrated in FIG. 1 is exemplary. Other embodiments may utilize additional elements, or may include fewer or more items than the ones included in FIG. 1. The embodiment illustrated in FIG. 1 should therefore not be interpreted to be exclusive or limiting, but rather exemplary or illustrative.

The fiction 104 is a sort textual description that provides background information regarding the quest to be performed. For example, the section 304 may describe a problem with the player's avatar, or with some other character in the game, which requires the player to perform some tasks in order to solve this problem.

Each task 112 includes an action that must be performed by the user in the game. In one embodiment, some tasks are related to an object, and completion of the tasks requires performing an action on the object. For example, one object may be a cow, and a related task may be "tending the cow." Other tasks do not require performing an action on an object, such as for example "visiting a neighbor."

The action may have to be done once or may have to be repeated multiple times in order to complete the task in the quest. A counter 110 indicates how many times the player has performed the action, and the total number of times required to complete this task (e.g., 5/30 means that the player has performed the action, such as clearing wildflowers, 5 times out of 30). Further, the task includes an unlock option 114 to complete (e.g., unlock) the task by spending game currency (e.g., gold horseshoes). In one embodiment, an icon 126 is associated with the task and provides a graphical representation related to the task.

Some tasks may be viral tasks, which require the cooperation from another player. In one embodiment, a button 120 provides the player the option to open a dialogue to originate a request for one or more friends to help with the viral task. A quest may include one or more non-viral tasks and one or more viral tasks.

In one embodiment, the quest includes a hint 124 that gives the player a clue on how to complete one or more of the tasks. Further, the quest includes one or more rewards 118, which the player gains when the quest is completed, e.g., all the tasks are completed. The reward may include a new asset for the player or an increase in one or more of the assets currently owned by the player. For example, the reward may include adding virtual currency, adding energy to play the game, getting a new cow, obtaining an item for a collection in the game, etc.

Figure 2:
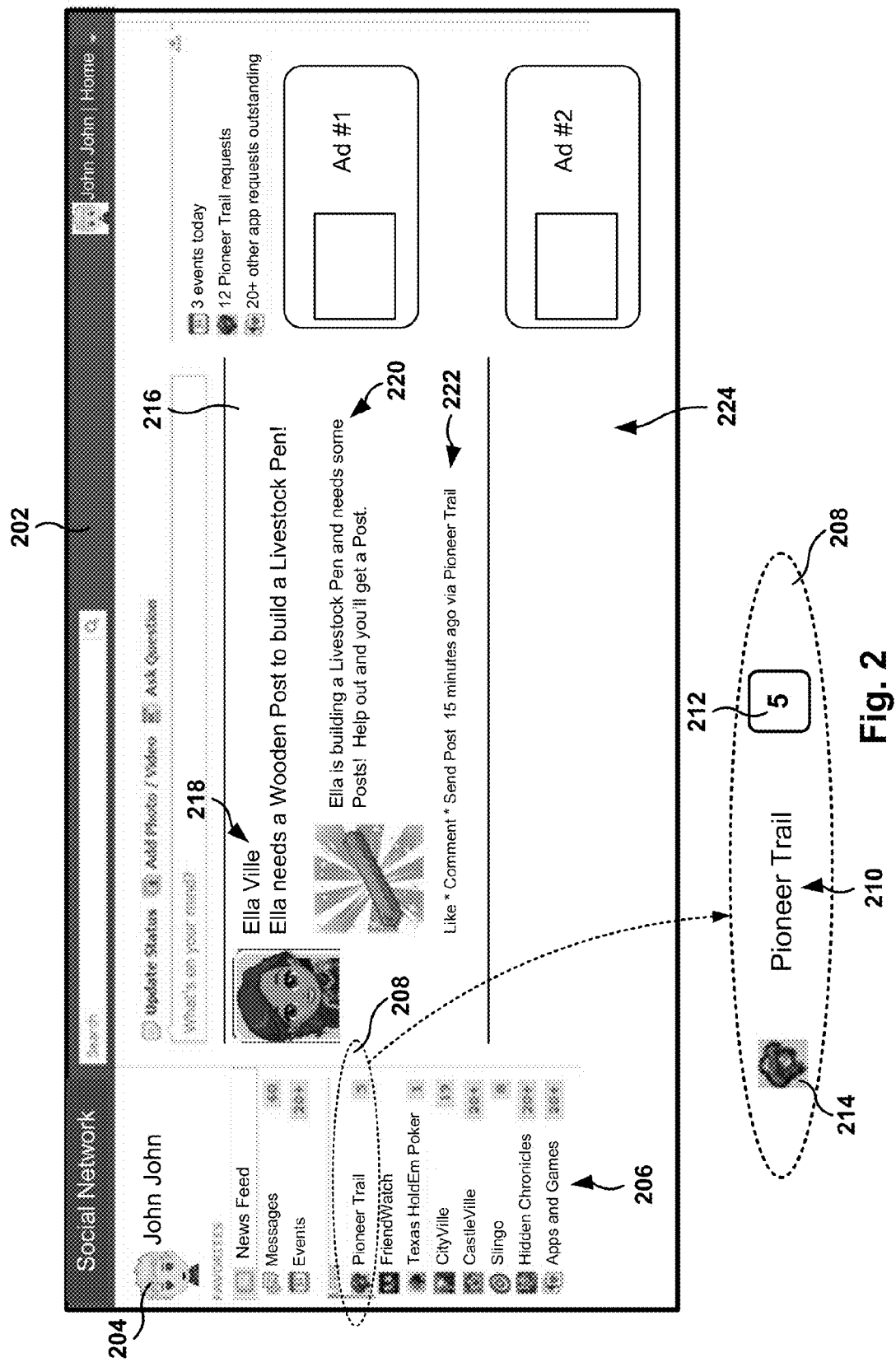
FIG. 2 illustrates the presentation of requests to a user of a social network, according to one embodiment.

FIG. 2 illustrates the presentation of requests to a user of a social network, according to one embodiment. In one embodiment, a webpage 202 of a user in a social network includes a feed section 224 that includes activities of the user 204 and friends of the user 204 in the social network.

In one embodiment, as the player gets quests assigned, the player gets assigned different tasks to complete the quest. For example, player 218 is building a "Livestock Pen" and needs one or more "Wooden Posts". In one embodiment, the tasks requires help from friends, i.e., viral help to complete the task. If the player asks friends for help, the player may generate a request 208 or a feed 216.

Game feeds appear in the feed section 224 and are posted by the requester in the requester's feed. Friends that have access to the requester's feed will see that the friend is asking for help. In one embodiment, the feed includes the name of the requester and a title for the feed 218, a message 220 giving details of the kind of help that the friend needs, and information about the feed 222, such as the time that the fee was posted, and buttons to provide feedback on the feed.

The petition for help may also be submitted via a request. Requests are also petitions for help, but requests are sent to specific one or more individuals. The requests appear as reminders next to the game icon 214 or, in one embodiment, in the notification icon of the social network. In one embodiment, requests 206 appear on the left panel of the webpage 202. The requests may be grouped by game. Each request 208, includes an icon 214, a name of the game 210 or some other form of identifier for the requester, and the counter 212, which indicates how many different requests have been originated in the corresponding game for this user (e.g., "John John" in the embodiment of webpage 202).

In one embodiment, if the friend clicks on the feed or the request, the friend is sent into the game (e.g., the game is started in the webpage 202 or in some other computer program), and after the friend provides the help in the game, then the requester of the help gets the requested part, and the friend (e.g., the helper) also gets the same requested part. By giving helpers a reward, helpers are encouraged to help in order to make progress in their own games.

It is noted that the embodiments illustrated in FIG. 2 are exemplary. Other embodiments may utilize different screen layouts, different presentations for the petitions for help, etc. The embodiments illustrated in FIG. 2 should therefore not be interpreted to be exclusive or limiting, but rather exemplary or illustrative.

Figure 3:
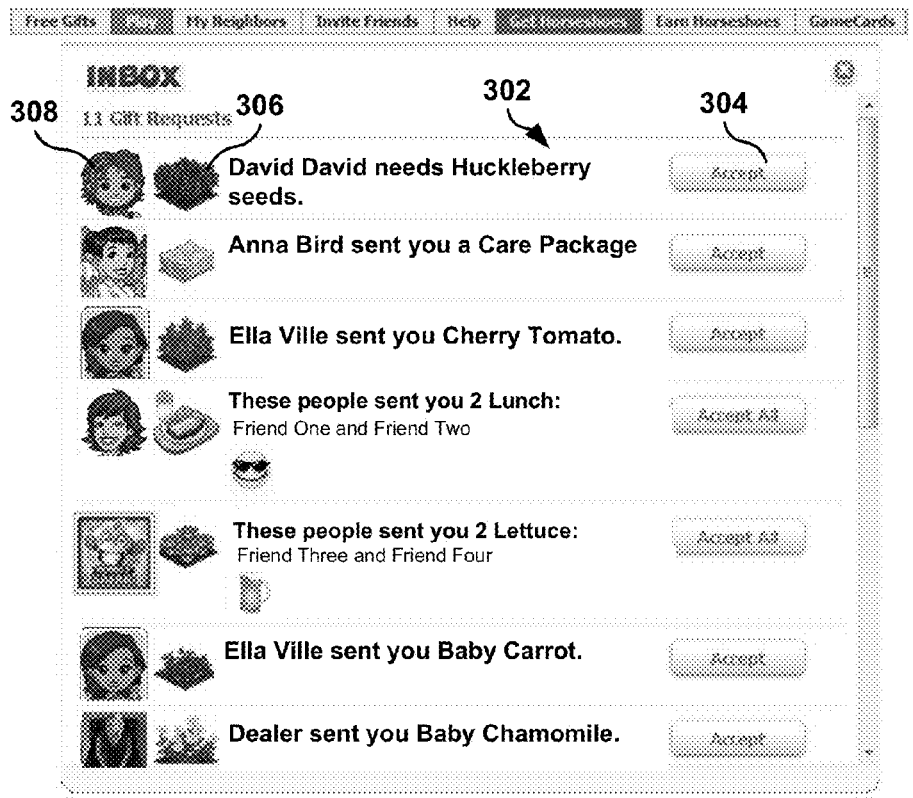
FIG. 3 shows a display of pending requests, according to one embodiment.

FIG. 3 shows a display of pending requests, according to one embodiment. In one embodiment, if the user clicks on the option to see the detailed requests, a webpage is presented listing all the pending requests. The list of requests may include requests for help, items gifted by friends (which need to be accepted by the player to be added to the game's inventory), or some other game-related activities that need an action in the game.

Each request may include an icon or photo 308 of the requester, and icon 306 associated with the game, task, or item needed or gifted in the game (e.g. Huckleberry seeds). In addition, the request may include a short message 302 describing the request, and a button (e.g., "Accept") to initiate an action associated with the request.

However, sometimes a player may need an item (e.g., a wooden post) but the player being asked for help does not need the same item. For example, the player may be looking for pulley parts, not wooden posts. In this case, the player is not incentivized to provide the help because helping the friend does not help the player.

In one embodiment, universal virals are used to solve the problem of players looking for different parts. A universal viral is a petition for help in a game from a first player to a second player (or to a plurality of players) to obtain a first game item, where the reward to the second player for helping the first player is a second game item that may be different from the first game item awarded to the first player. In other words, the rewards for the first player and the second players are different, although in some cases the rewards may happen to be the same if both players are looking for the same game item.

Figure 4:
FIG. 4 illustrates the presentation of a universal viral in the feed, according to one embodiment.

FIG. 4 illustrates the presentation of a universal viral in the feed, according to one embodiment. The universal viral describes that someone needs help (e.g., "Ella Ville needs a Helping Hand"), and that the reward for helping is to get an item needed by the helper (e.g., "get What you Need"). Anyone can place a universal viral in a feed or in a request, but the end result, e.g., the reward for helping, may be different depending on which friend provides the help.

In some social networks, the posts placed on the feed are presented in the same format to all those with access to that post, and there is no customization of the feed based on the reader. The universal viral allows the placement of a request for help in the feed that is relevant to all those reading the feed, but with an end reward that may be different. For example, if the feed included a message such as "Help Ella to get a Wooden Post and you will get Nails" then the feed would be relevant to those needing nails, but not to other players that do not need nails.

In one embodiment, the universal viral allows the posting of a help request without committing to a specific reward for the helper, although other embodiments may describe a specific reward that is customized for each recipient. The actual reward will be determined after the helper provides help, as discussed in more detail below. In one embodiment, the universal viral (e.g., "Helping Hands") is generic and may be applied to any game fiction. Although different potential helpers may need different things, the feed looks the same to all of them.

In the embodiment of FIG. 4, the feed indicates that Ella needs a Helping Hand, without specifically defining what Ella needs. In addition, the feed indicates that if the friend provides help, the friend will get "What You Need," which is also a generic or universal message, without specificity to the reward to be gained.

Figure 5:
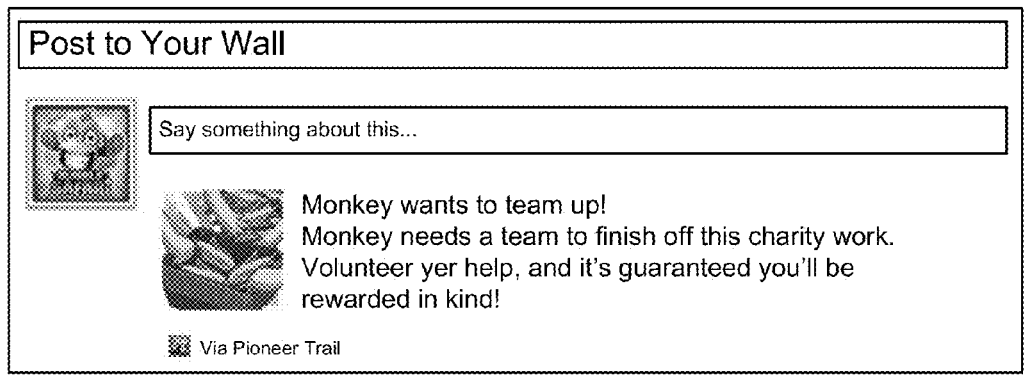
FIG. 5 illustrates a team viral request, in accordance with one embodiment.

FIG. 5 illustrates a team viral request, in accordance with one embodiment. FIG. 5 illustrates another universal viral called "teamwork." In this case, the feed notifies friends that a player (e.g., Monkey) wants to team up. In order to team up, the friend must enter the game and request to team up, which means helping the friend with one or more tasks.

In return for helping, the friend is promised that "it is guaranteed you will be rewarded in kind," which means that the player will receive a reward customized for the player. As in FIG. 4, the actual reward is not specified because this is a universal viral that allows the helper to receive a reward that is desirable or helpful in the helper's game.

In one embodiment, the game gives the player an opportunity to select the reward for helping. After offering the help, the game provides a list of possible items needed by the player, and the player is able to choose which item to obtain as reward. In another embodiment, the game selects the item to be awarded, and the player has no choice for selecting the reward. This way, the game managers are able to control the availability and distribution of certain items. For example, there may be certain game items that are difficult to obtain, requiring the accomplishment of difficult tasks or the purchase of these items with game currency. If the player is allowed to select a reward, then the difficult-to-obtain items would be easier to obtain after providing viral help.

Figure 6:
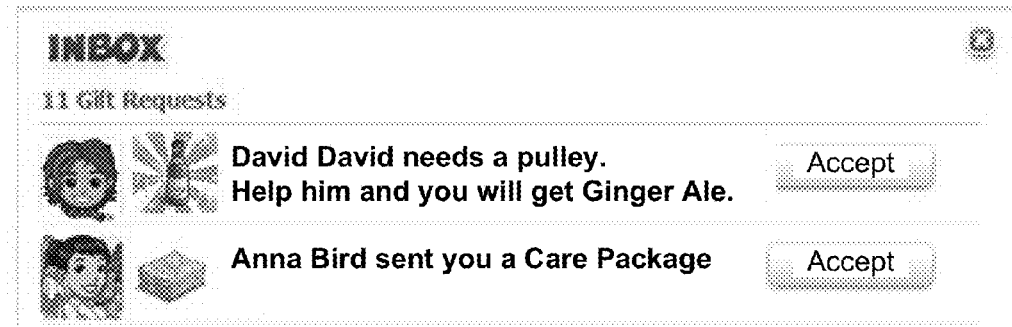
FIG. 6 illustrates a custom viral request with a reward customized to the request recipient, according to one embodiment.

FIG. 6 illustrates a custom viral request with a reward customized to the request recipient, according to one embodiment. Universal viral may be used in feeds or in requests. In one embodiment, the universal viral may be customized according to the requester and/or the recipient of the request. For example, requests are sent directly to players and are not posted on the feed. Therefore, the requests may be customized because there are only two persons involved in the requests, the requester and the recipient, also referred to as the requested.

In one embodiment, the universal viral request includes a message specifying the item requested by the requester, and the specific reward to be obtained by the helper. For example, in the embodiment of FIG. 6, the game describes that player David needs a pulley, and the reward for the player receiving the request (i.e., the requested) would get Ginger Ale.

As discussed above, it is easier to place a message in the feed of the social network specifying that the player will "get what he needs" than actually specifying the specific reward. However, requests are sent directly from one player to another in the social network, therefore, it is relatively easier to specify the reward for helping in a request.

Figure 7:
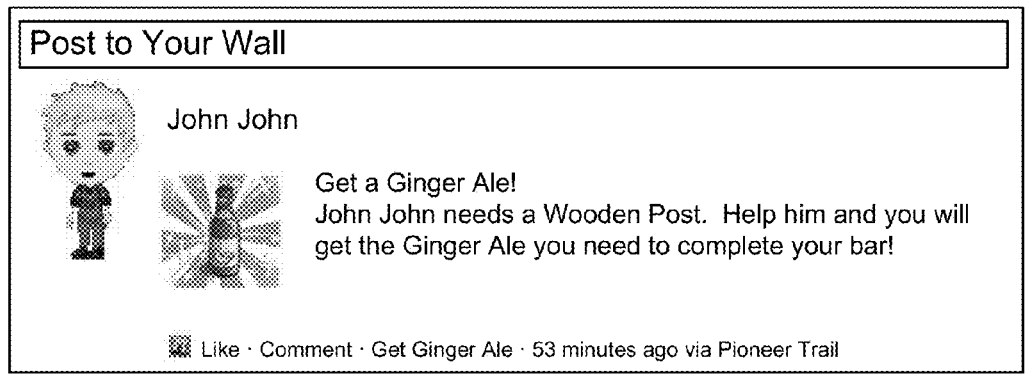
FIG. 7 illustrates a custom viral feed with a reward customized to the request recipient, according to one embodiment.

FIG. 7 illustrates a custom viral feed with a reward customized to the request recipient, according to one embodiment. In one embodiment, the messages in the feed are also customized according to the recipient, utilizing the capabilities offered by the social network in wall-to-wall messaging, because in a wall-to-wall messaging, communications affect only two players at time.

FIG. 7 illustrates a universal viral with a specific request in a specific reward. In this example, John John has posted a request in the feed to get a Wooden Post. In exchange for helping the friend (John John), the helper will get an item that the requester needs. In this case, the requested is promised to get Ginger Ale in order to complete a bar that the requester is building in the game.

Different combinations to the specificity of the request and the reward are also possible. For example, in one embodiment, the request may be generic (e.g., "John needs a Helping Hand") and the reward may be a specific (e.g., "You will get Pulley Parts if you help John").

Figure 8A:
FIG. 8A illustrates a user's wish list display, according to one embodiment.

FIG. 8A illustrates a user's wish list display, according to one embodiment. In one embodiment, players are able to create wish lists containing items that the player would like to obtain in the game. In one embodiment, the gaming interface includes the display 802 of collections (e.g., 804 and 806) being gathered by the player. The player is able to add items missing from the collections to wish list 808, and have readily a list of the items needed.

The player may also share the items in the wish list with other players by choosing the game button "Share" 810. Once the player shares the wish list, the wish list may be share in the game, or posted on the feed of the player in the social network, or sent as a request to one or more friends in the social network. After viewing the items needed by friends, players are able to bargain or work cooperatively in order to obtain items needed by players and their friends.

The items in the wish list may be used in order to determine the reward for helping with the universal viral. In one embodiment, upon completing a universal viral help action, the player is presented with the wish list, and the player is able to select one item from the wish list as a reward. In another embodiment, the player is presented with a subset of the items in the wish list (selected by the game), and the player is only allowed to select from this subset of items. This allows the game provider to control which items are being used as rewards for universal virals, and the availability or difficulty to obtain of certain items.

In yet another embodiment, the game selects one of the items from the wish list of the reward, and the player is not given the choice of selecting which item from the wish list to obtain. In one embodiment, if a player keeps the wish list short in order to obtain a particular item that the player desires, the game may deny the reward from the wish list and instead provide another item from the game to the player.

Figure 8B:
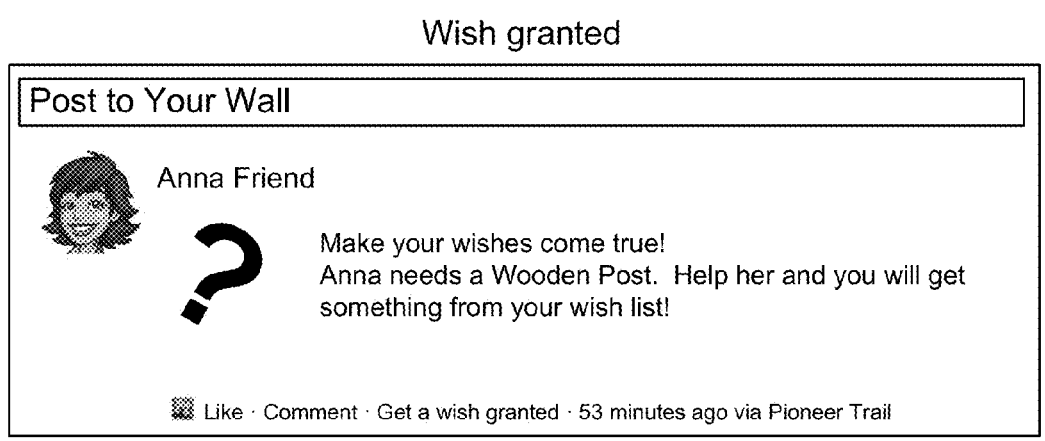
FIG. 8B illustrates a custom viral feed with a reward from the recipient's wish list, according to one embodiment.

FIG. 8B illustrates a custom viral feed with a reward from the recipient's wish list, according to one embodiment. The embodiment of FIG. 8B illustrates a feed with a request for help that includes the specific item to be gained by the requester and the reward for help to be selected from the wish list of the helper. For example, Anna has placed a feed identifying that "Anna needs a Wooden Post," and the game incentivizes friends by promising that "you will get something from your wish list!"

If the friend helps Anna, then the game will select an item from the helper's wish list and give the item to the helper. In another embodiment, the helper is able to select one item from the wish list as the reward.

In one embodiment, the game keeps an internal wish list, which includes one or more items needed by a player to complete one or more quests. The internal wish list is not visible to the player, and the internal wish list may be used with "Helping Hands" requests or feeds. In this case, the game may promise that the helper will get something she needs (e.g., the embodiment of FIG. 4 discussed above), and the reward is given from the internally-maintained wish list.

In one embodiment, the game includes all the items needed by the player in any quest in the internal wish list. In another embodiment, the game determines which items are added to the internal wish list. For example, some items may not be added to internal wish list as the game developer may want to have some special items that are harder to obtain, or that must be obtained in a specific way (e.g., to learn certain skill in the game), or for any other reason.

It is noted that the embodiments illustrated in FIGS. 2-8B are exemplary. Other embodiments may utilize different layouts, different messages, titles, presentations, etc. The embodiments illustrated in FIGS. 2-8B should therefore not be interpreted to be exclusive or limiting, but rather exemplary or illustrative.

Figure 9:
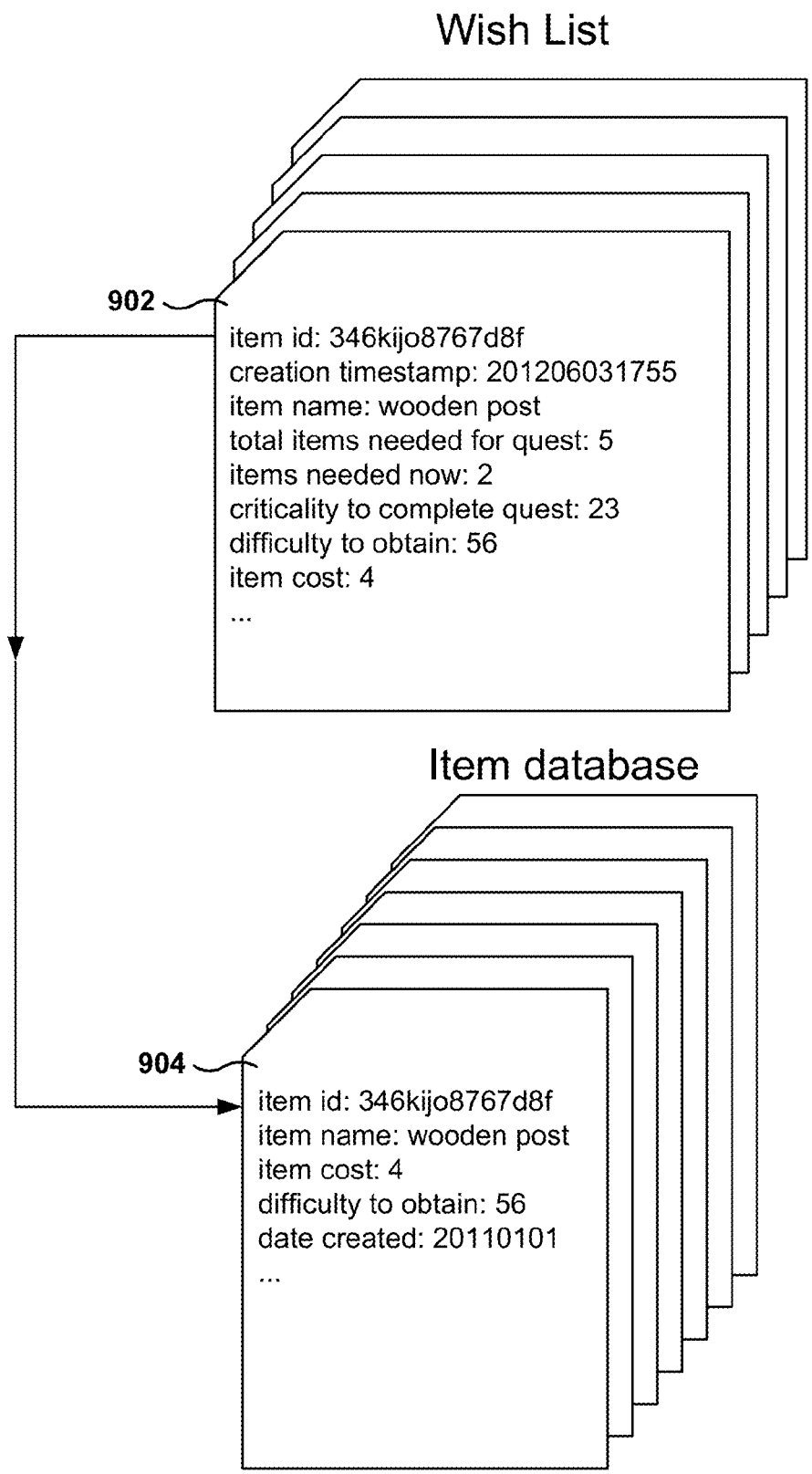
FIG. 9 illustrates a sample data structure to store wish-list data, according to one embodiment.

FIG. 9 illustrates a sample data structure to store wish-list data, according to one embodiment. The embodiment of FIG. 9 corresponds to an internal wish list kept by the game, but it may also be utilized for an "external" wish list visible to the player in the game.

Each item 902 in the wish list includes one or more of an item or element identifier; a creation timestamp indicating a time when the element was added to the wish list; a name for the item (e.g., wooden post); a count of the total number of items needed to fulfill the requirement to complete a task associated with this item (e.g., five wooden posts required to complete this task within a quest); a member of the items still needed to fulfill the task (e.g., two more wooden posts are needed to complete this task); a criticality measure which provides a value associated with how needed is this item complete the task (e.g., if this is the last item needed to complete a quest; the criticality measure will have a high value), a difficulty value identifying a measure of how difficult is to obtain this item in the game; a cost required by this item in the game; etc.

In one embodiment, the wish list is linked to an item database that includes the items that may be used to complete tasks in the game. In one embodiment, each item 904 in the item database includes one or more of an item identifier, item name, difficulty to obtain, the date the item was created, etc. In one embodiment, some of the data associated with a particular item is not kept in the wish list, and instead a pointer to the associated item in the item database is kept.

In one embodiment, the wish list is organized as a queue, and the queue stores the list of items needed by the player. When a player gets a reward from a universal viral, the game selects the item with the highest priority in the wish list queue. The highest priority might be determined according to different rules. In the case of a FIFO (First In, First Out) queue, the oldest item in the queue will be selected. In another embodiment, the priority is determined based on the criticality measure of the item, and the game will award the most critical item to the player. In other embodiments, selection rules are used to determine which item is rewarded, as discussed in more detail below with reference to FIG. 10.

In one embodiment, when a player needs multiple items of the same kind (e.g., five wooden posts), the game awards an item to the player for each viral help offered, until all the needed items are acquired. Then, the game selects the next item in the list and starts assigning rewards from the next item until the item is also satisfied.

In one embodiment, the player may be able to buy some of the tasks, meaning that the player may use game currency to obtain these items. If the player buys these items, then the items are taken out of the wish list. Of course, if the player also gets some of the items during normal play (e.g., a reward for chopping a tree), then the items will be taken out of the wish list, or the counter associated with the item will be decreased accordingly.

Figure 10:
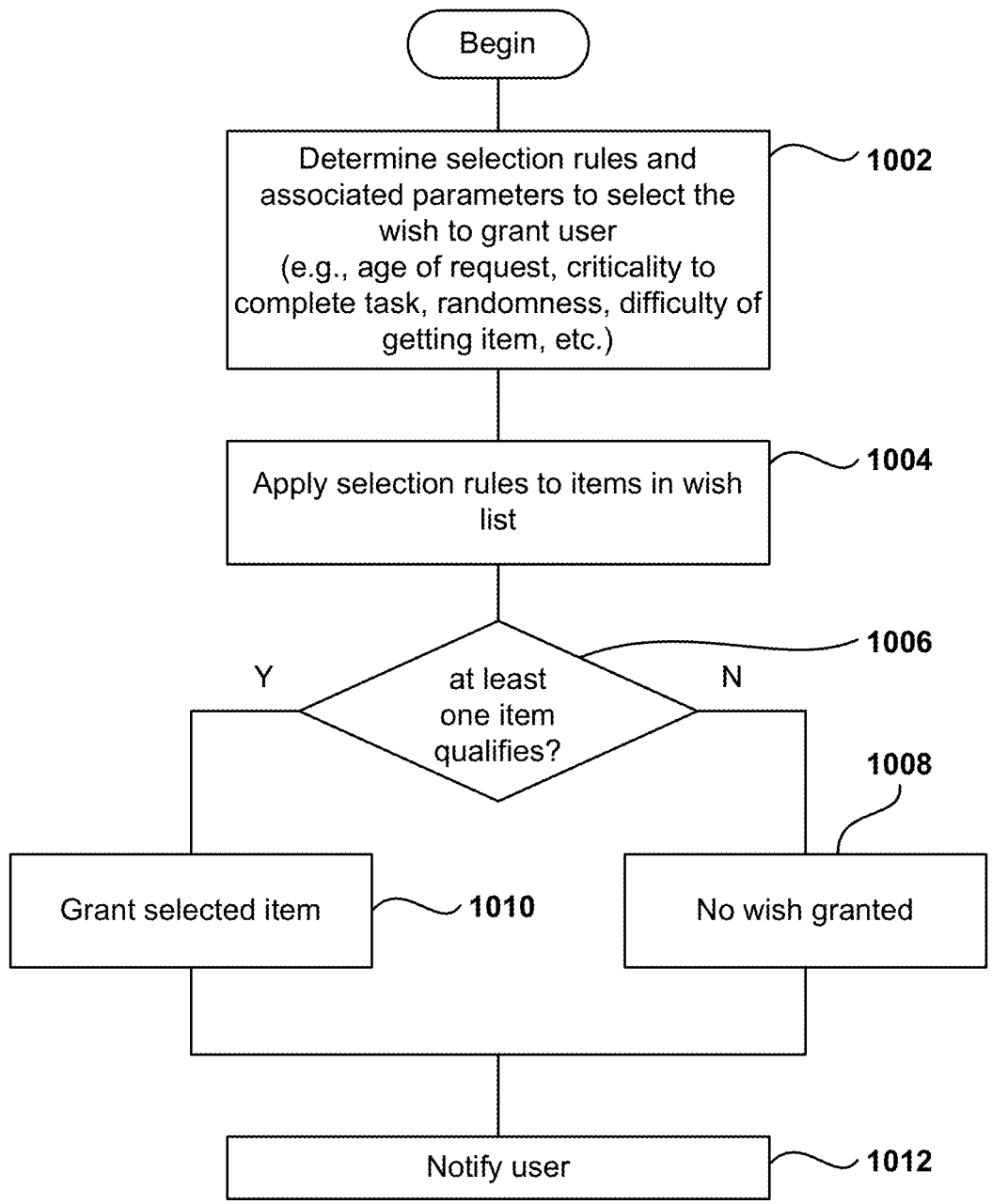
FIG. 10 shows the flow of a process for granting a wish, according to one embodiment.

FIG. 10 shows the flow of a process for granting a wish, according to one embodiment. As discussed above, sometimes the player is promised a reward, but the game does not specify the specific reward. Instead, the game may offer a different promise, such as "get an item from your wish list," "get something that you need," "get some seeds" (may be one of many types of seeds), "get something for the cabin," etc.

In one embodiment, the game utilizes a plurality of rules for selecting the reward given to a player. The rules may be associated with the difficulty to obtain an item, how much an item is needed by the player, how long has the player needed that item, is this the last item needed to complete a task, use a degree of randomness to assign easy or difficult-to-obtain rewards, how recently has the item been in the game (e.g., newly created items may be harder to obtain), how expensive to buy the item is, etc.

The rules may be combined in different ways by the game. In one embodiment, the rules are assigned weights and the rules are then combined to calculate a score for the possible candidate items to be rewarded. The item with the highest score will be awarded to the player. In another embodiment, some rules may not always be applied. For example, a rule may be only used if some other rules do not apply to a particular situation in the game.

A flowchart of FIG. 10 illustrates a method for granting rewards to players that provide viral help. In operation 1002, the selection rules are determined for granting a reward. In addition, parameters associated with the determined selection rules are also identified. From operation 1002, the method flows to operation 1004 where the selection rules are applied to items in a wish list of the player. In one embodiment, the wish list is created and managed by the player, while in another embodiment the wish list is internal to the game and not visible to the player. The wish list may include all the items needed by the player or a subset of all the items needed. In another embodiment, the game may include in the wish list an item that may not be needed by the player yet, but that may encourage the player to start a new quest.

In operation 1006, a check is made to determine if at least one reward item meets the selection rules. If there is at least one item, the method continues to operation 1010 where the selected item is granted to the player. If none of the items qualifies, the method flows to operation 1008 and the reward (e.g., wish) is not granted to the player. In one embodiment, some item is awarded to the player in order to keep the promise from the game that the reward would be granted for helping. The item may be a generic item, such as currency, or some item that the player has not requested or does not currently need.

From operation 1010 or from operation 1008, the method flows to operation 1012 where the user is notified that an item was granted or that, for some reason, an item was not granted.

Figure 11:
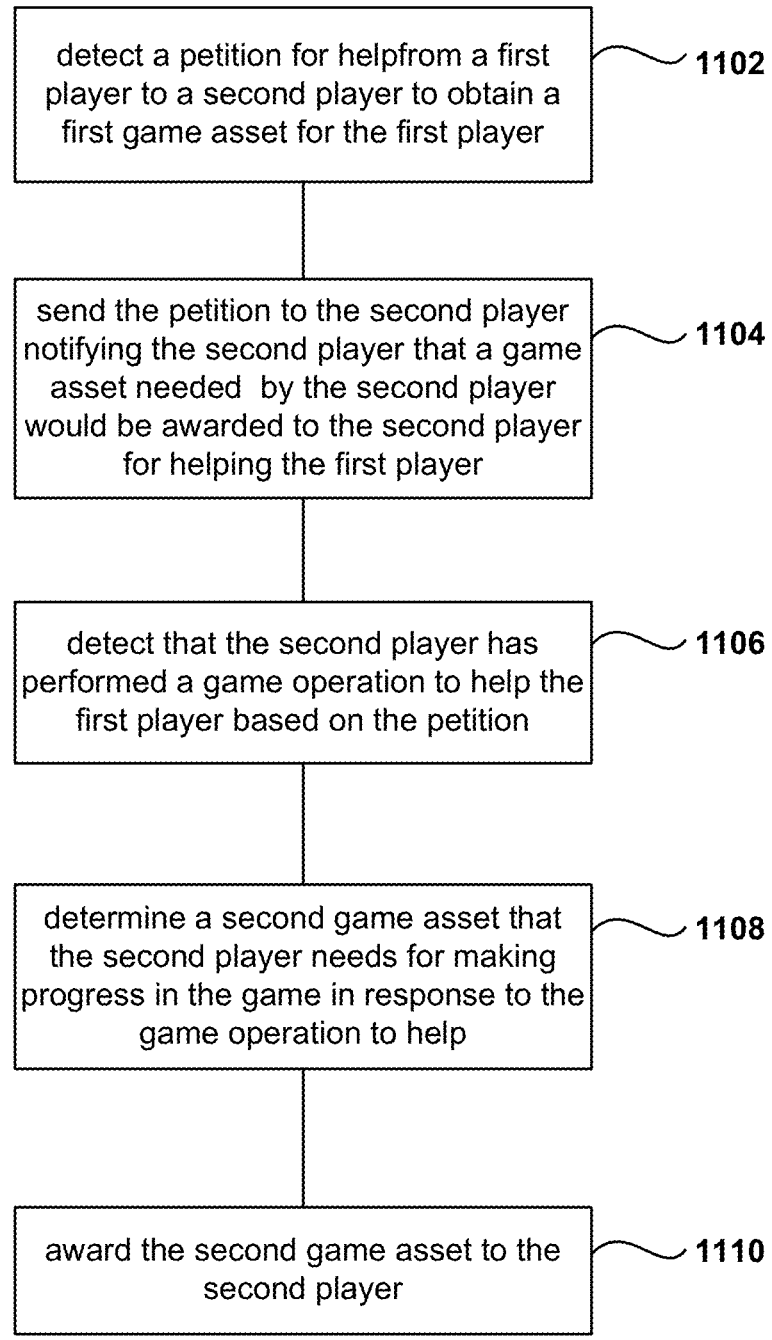
FIG. 11 shows the flow of a process for executing a game, according to one embodiment.

FIG. 11 shows the flow of a process for executing a game, according to one embodiment. In operation 1102, a request is detected, the request being from a first player to a second player for help in obtaining a first game asset for the first player. From operation 1102, the method flows to operation 1104, where the request is sent to the second player. With the request, the second player is notified that a game asset needed by the second player would be awarded to the second player for helping the first player.

From operation 1104, the method flows to operation 1106 where the game detects that the second player has performed a game operation to help the first player, based on the received request. In one embodiment, the request is a universal viral request which may take the form of a feed or a request in a social network. From operation 1106, the method flows to operation 1108 with a second game asset is determined for rewarding the second player for the viral help, in response to the game operation performed in order to help. In one embodiment, the second game asset is needed by the second player for making progress in the game.

From operation 1108, the method flows to operation 1110 where the second game asset is awarded to the second player. In one embodiment, the player is notified of the reward via a message placed in the game, and in another embodiment, the player is notified via a message placed on the social network. It is noted that the operations of the method are executed by a processor.

Figure 12:
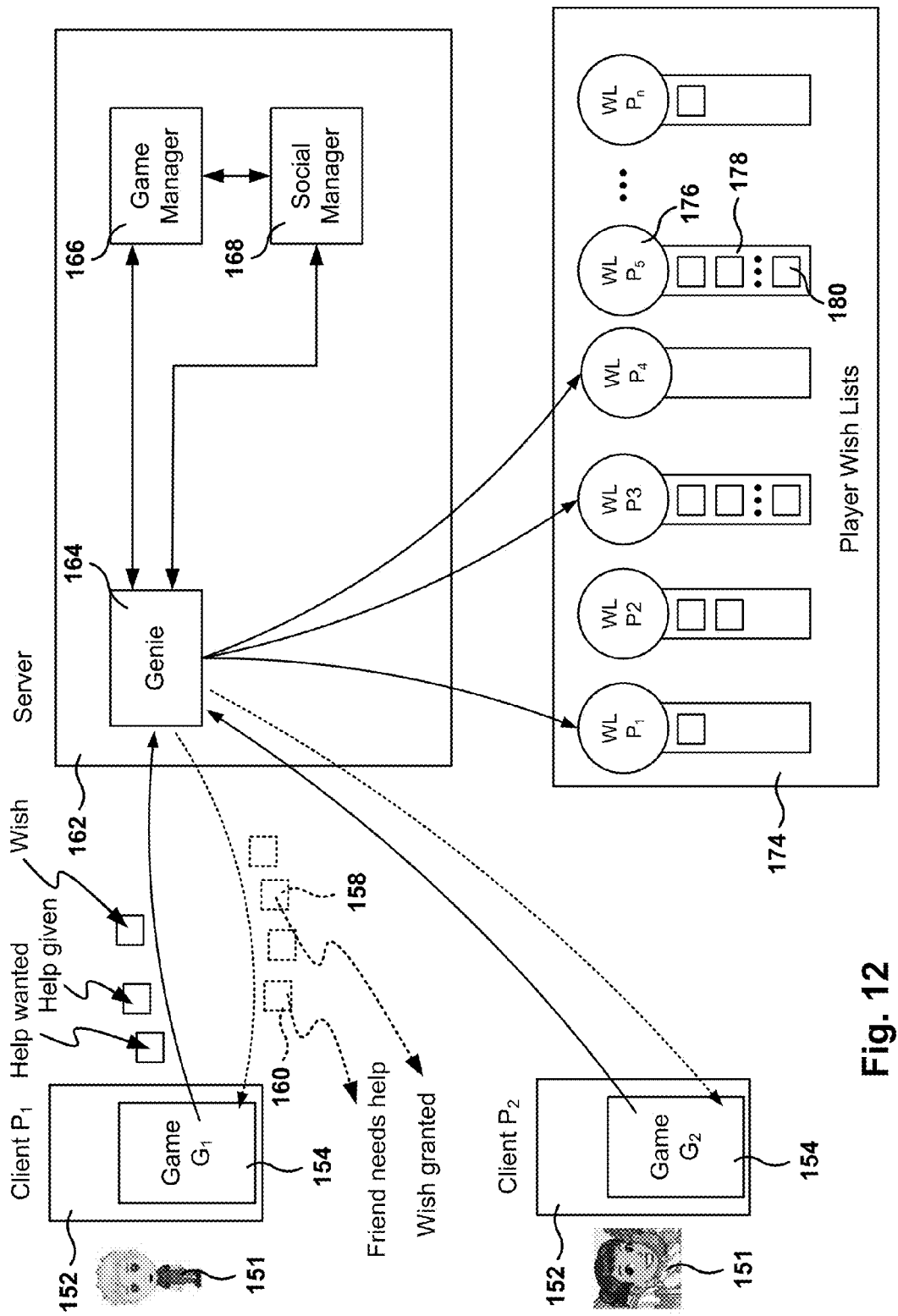
FIG. 12 illustrates interactions between client and server for processing viral requests, according to one embodiment.

FIG. 12 illustrates interactions between client and server for processing viral requests, according to one embodiment. In one embodiment, the online game is hosted by server 162, which includes a reward manager 164 (also referred to as a "genie" or as a game wish manager), a game manager 166, and a social manager 168. A player $P_1$ 151 plays the game utilizing client device 152 executing a game computer program 154 operable to process viral requests. In one embodiment, the computer program 154 is a web browser, and in another embodiment other computer programs may also be utilized to play the game, such as a computer program loaded on a computing device for the exclusive purpose of playing the game.

Computer program 154 interfaces with genie 164 to send information regarding viral requests (also referred to as "help wanted") or to send information regarding help provided to other players ("help given"). In addition, computer program 154 may also send information regarding items to be added to the wish list of player 151, and other game related messages. Genie 164 interfaces with computer program 154 to transmit updates regarding viral requests 160, whishes granted 158, and other viral or game-related messages.

When a player requests a wish (e.g., a desire for certain game item), genie 164 adds the wish to wish list database 174. The wish list database 174 includes information regarding the wish list for each player, which includes wish list header information 176 and wish list 178. Wish list 178 includes one or more wish items, and in one embodiment, the wish list 178 is organized as a prioritized queue, but other implementations are also possible (see an exemplary wish list structure with reference to FIG. 9).

In one embodiment, when a player helps another player (e.g., a viral help), a wish is granted from the helping player's wish list. Genie 164 utilizes selection rules to select one item from the wish list and interfaces with game manager 166 to grant the helper the awarded item.

It is noted that the embodiments illustrated in FIG. 12 are exemplary. Other embodiments may utilize different update mechanisms, different modules, or combine the functionality of one or more modules into a single module. The embodiments illustrated in FIG. 12 should therefore not be interpreted to be exclusive or limiting, but rather exemplary or illustrative.

Figure 13:
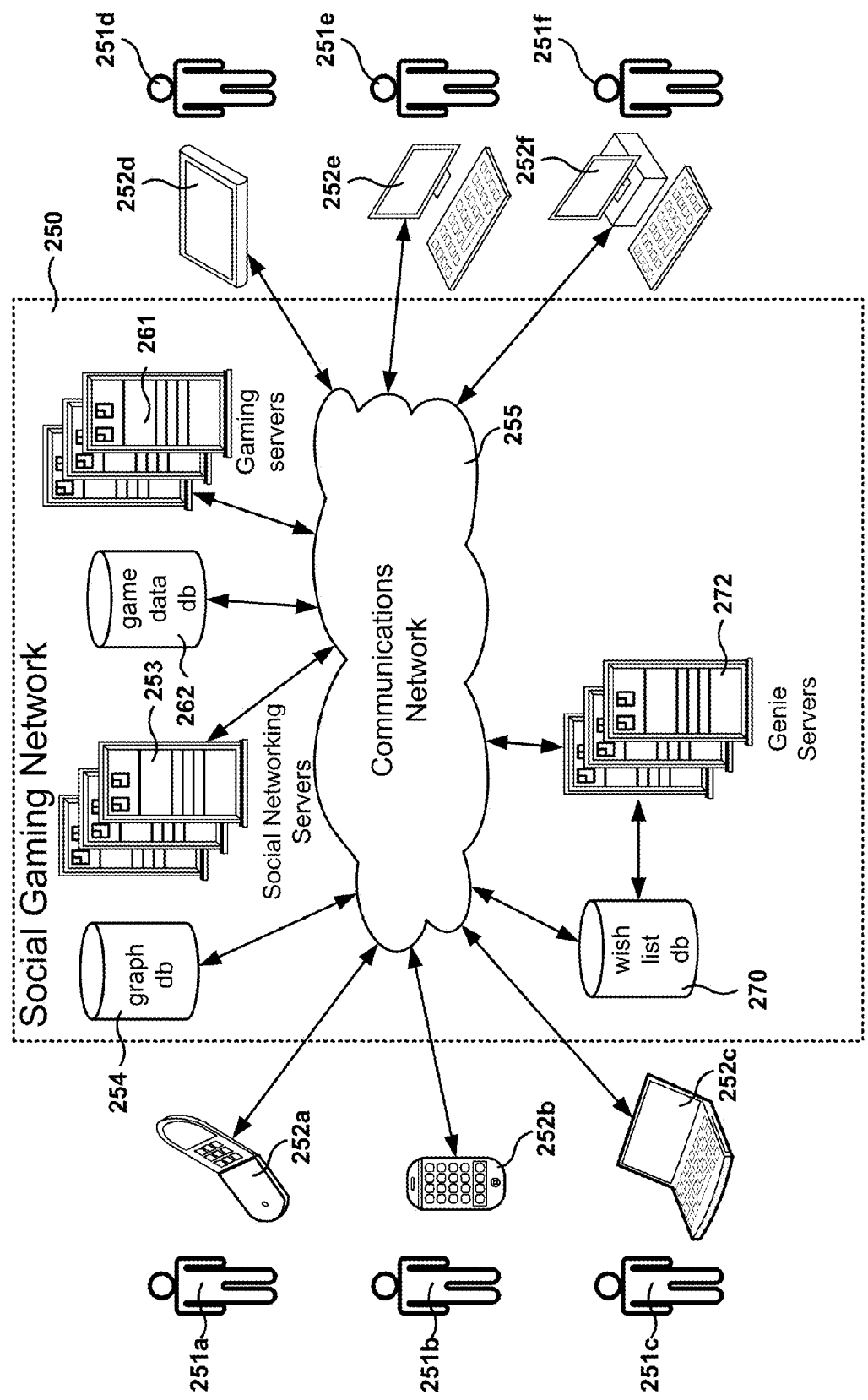
FIG. 13 shows a block diagram illustrating a social gaming network architecture, according to one embodiment.

FIG. 13 shows a block diagram illustrating a social gaming network architecture, according to one embodiment. In some implementations, a plurality of players (e.g., 251a-251f) may be utilizing a social gaming network 250. Each player interacts with the social gaming network via one or more client devices (e.g., client devices 252a-252f). The clients may communicate with each other and with other entities affiliated with the gaming platform via communications network 255. Further, the players may be utilizing a social networking service provided by a social networking server (e.g., social networking servers 253) to interact with each other.

When a player provides an input into the player's client device, the client device may in response send a message via the communications network to the social networking server. The social networking server may update the player profile, save the message to a database, send messages to other players, etc. The social gaming network may include a social graph database 254, which stores player relationships, social player profiles, player messages, and player social data.

The gaming servers 261 host one or more gaming applications, and perform the computations necessary to provide the gaming features to the players and clients. One or more gaming databases 262 store data related to the gaming services, such as the gaming applications and modules, virtual gaming environment data, player gaming session data, player scores, player virtual gaming profiles, game stage levels, etc. The gaming servers may utilize the data from the gaming databases to perform the computations related to providing gaming services for the players.

Genie Servers 272 manage the rewards for responding to universal virals, including the creation, tracking, expiration, abandonment, and deletion of rewards. In addition, a wishlist database 270 holds wish list state information, such as the wish list database 174 of FIG. 12.

Figure 14:
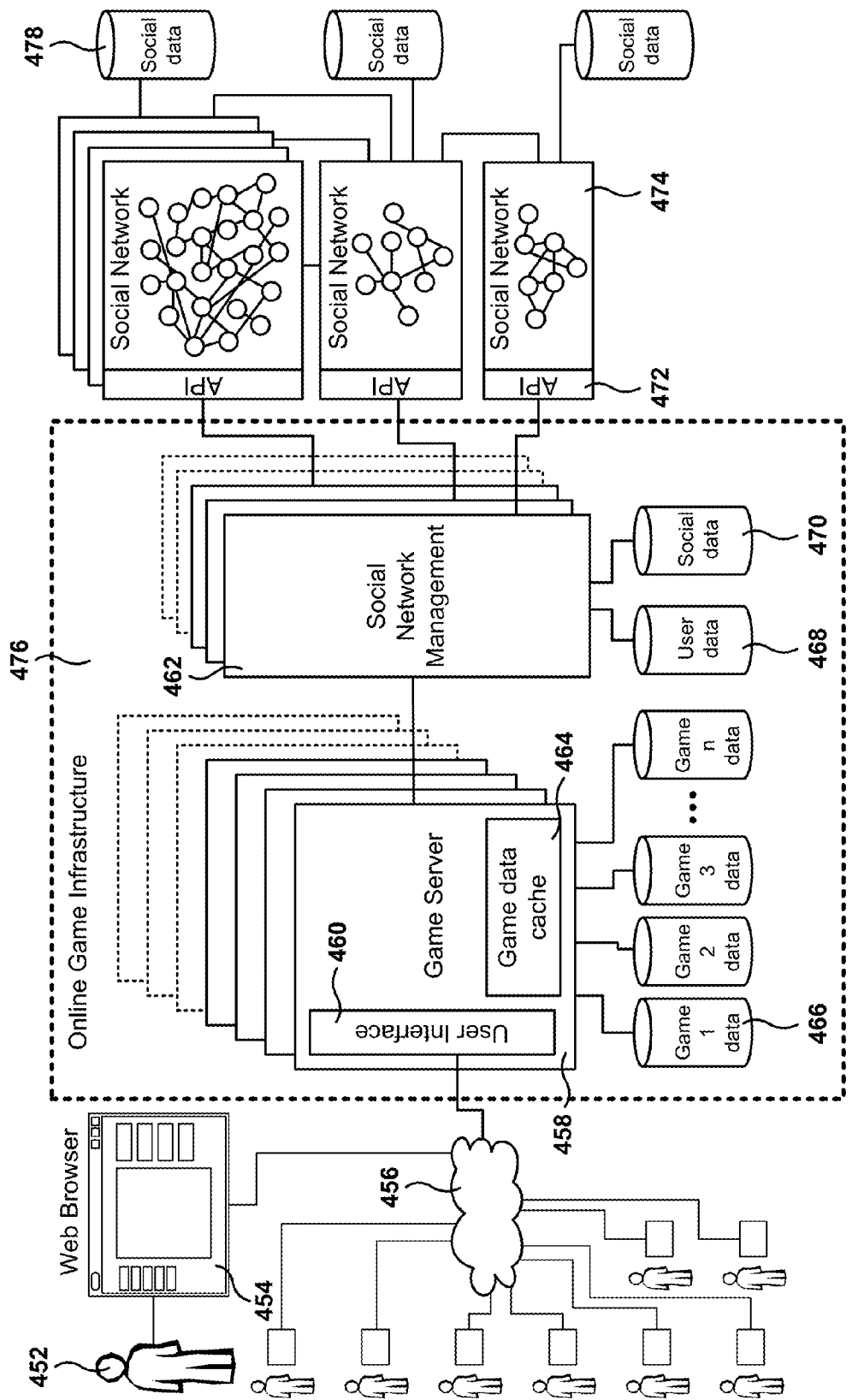
FIG. 14 illustrates an implementation of an online game infrastructure, according to one embodiment.

FIG. 14 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 14 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 14 should therefore not be interpreted to be exclusive or limiting, but rather exemplary or illustrative.

Figure 15:
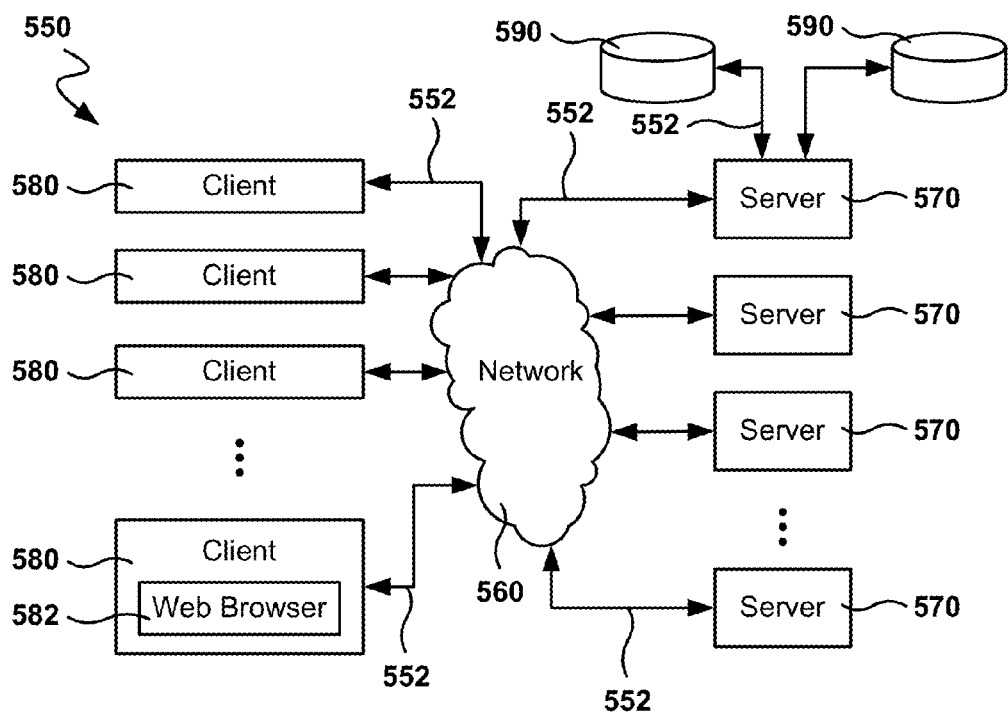
FIG. 15 illustrates an example network environment suitable for implementing embodiments.

FIG. 15 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, jackpot server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 16:
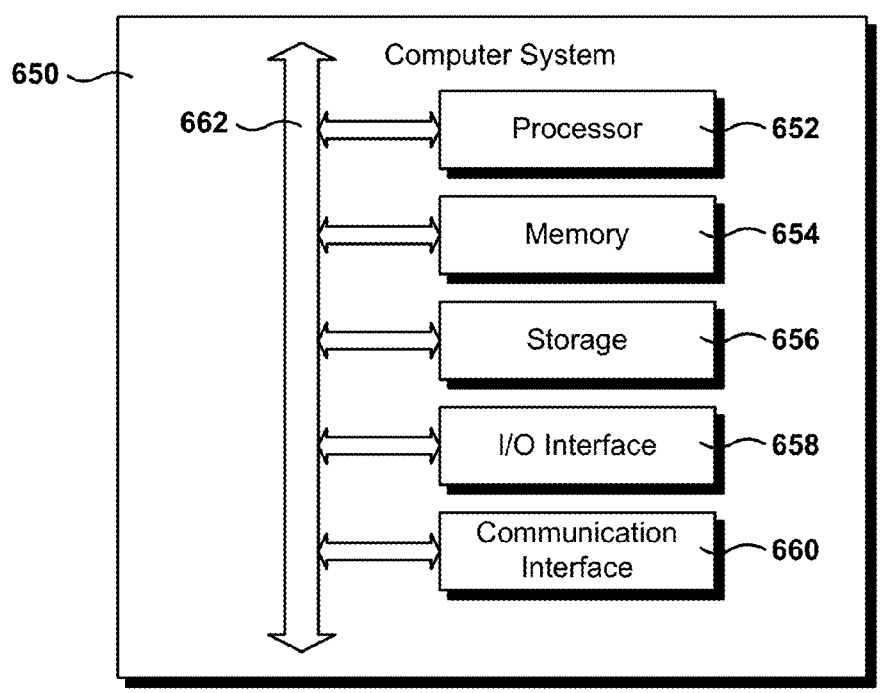
FIG. 16 illustrates an example computer system for implementing embodiments.

FIG. 16 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A processor-implemented method for executing a game, the method comprising:
   obtaining, from a social network of a first player, a list of friends of the first player utilizing an application programming interface (API) to access the social network;
   receiving, from the first player, a selection of a second player from the list of friends;
   receiving, from the first player, a command to send a request via the social network to the selected second player, the request being a petition for help in the game to obtain a first game asset for the first player;
   sending the petition to be posted in the social network of the second player to notify the second player that an unspecified game asset is to be awarded to the second player for helping the first player;
   detecting, by the processor executing the game, that the second player has performed a game operation to help the first player based on the petition;
   selecting, according to selection rules by a game wish manager, a second game asset from a wish list of the second player to be the unspecified game asset, the wish list including game assets pre-identified by the second player, the wish list managed by the game wish manager and stored on a wish list database; and
   awarding the second game asset to the second player in the game as determined by the game wish manager to enable completion of an incomplete quest, wherein operations of the method are executed by a processor.

2. The method as recited in claim 1, wherein the request is posted in a feed of the second player in the social network.

3. The method as recited in claim 1, wherein the first game asset is different from the second game asset.

4. The method as recited in claim 1, wherein the second game asset is needed by the second player to complete a quest in the game.

5. The method as recited in claim 1, wherein the selecting of the second game asset is based on an analysis of one or more incomplete quests of the second player.

6. The method as recited in claim 1, wherein the second game asset is also needed by the second player to complete a collection in the game.

7. The method as recited in claim 1, wherein operations of the method are performed by a computer program when executed by one or more processors, the computer program being embedded in a non-transitory computer-readable storage medium.

8. The method as recited in claim 1, wherein the second game asset is awarded to the second player without taking the game second asset from the first player.

9. The method as recited in claim 1, wherein the game wish manager is further configured to follow selection rules and associated parameters to select the second game asset, the selection rules and associated parameters including an age of request, criticality of task, randomness factors, and a difficulty of obtaining game asset.

10. The computer-implemented method as recited in claim 1, wherein the game wish manager is configured to organize the wish list as a prioritized queue.

11. A system for executing a game, the system comprising:
    a social manager configured to obtain, from a social network of a first player, a list of friends of a first player utilizing an application programming interface (API) to access the social network;
    a processor;
    a game wish manager;
    a wish list database; and
    a game manager operable to receive from the first player, a selection of a second player from the list of friends, and also operable to receive from the first player, a command to send a request via the social network to the selected second player, the request being a petition for help in the game to obtain a first game asset for the first player;
    wherein the social manager is configured to send the petition to be posted in the social network of the second player to notify the second player that an unspecified game asset is to be awarded to the second player for helping the first player;
    wherein the game manager is further configured to detect that the second player has performed a game operation to help the first player based on the petition;
    wherein the game wish manager is operable to
    select, based on selection rules, a second game asset from a wish list of the second player to be the unspecified game asset, the wish list including game assets pre-identified by the second player, the wish list being managed by the game wish manager and stored on the wish list database; and award, as determined by the game wish manager to enable completion of a collection, the second game asset to the second player.

12. The system of claim 11, wherein the wish list includes a plurality of game assets needed by the player to make progress in the game.

13. The system of claim 11, wherein each game asset in the wish list has an associated data structure stored in memory, the data structure includes one or more of an item identifier, a creation timestamp, a name, a value indicating how many items are needed, a criticality value, a difficulty in obtaining the item, and a cost to obtain the item.

14. The system of claim 11, wherein the selection rules include amount of time that the item has been needed by the second player, difficulty in obtaining the game asset, cost of obtaining the game asset, and a degree of randomness.

15. The system of claim 11, wherein the petition is sent to a plurality of players.

16. The system for executing a game as recited in claim 11, wherein the game wish manager is further configured to organize the wish list as a prioritized queue.

17. A processor-implemented method for executing a game, the method comprising:

obtaining, from a social network of a first player, a list of friends of the first player utilizing an application programming interface (API) to access the social network;

receiving, from the first player, a selection of a second player from the list of friends;

receiving, from the first player, a command to send a request via the social network to the selected second player, the request being a petition for help in the game to obtain a first game asset for the first player;

selecting, by a game wish manager based on selection rules, a second game asset that the second player needs for making progress in the game, wherein the second game asset is selected from a wish list of game assets pre-identified by the second player, the wish list being managed by a game wish manager and stored on a wish list database;

sending the petition to be posted in the social network of the second player to notify the second player that the second game asset is to be awarded in the game to the second player for helping the first player;

detecting, by the processor executing the game, that the second player has performed a game operation to help the first player based on the petition; and awarding the second game asset to the second player, wherein operations of the method are executed by a processor.

18. The method as recited in claim 17, wherein the first game asset is different from the second game asset.

19. The method as recited in claim 17, wherein operations of the method are performed by a computer program when executed by one or more processors, the computer program being embedded in a non-transitory computer-readable storage medium.

20. The processor implemented method for executing a game as recited in claim 17, wherein the game wish manager is configured to organize the wish list as a prioritized queue.

* * * * *